Oct. 24, 1950  T. M. BERRY ET AL  2,527,208
SUPERSONIC TESTING APPARATUS
Filed July 27, 1944  2 Sheets-Sheet 1

Inventors:
Theodore M. Berry,
Richard Warren Samsel,
by Harry E. Dunham
Their Attorney.

Inventors:
Theodore M. Berry,
Richard Warren Samsel,
by Harry E. Dunham
Their Attorney.

Patented Oct. 24, 1950

2,527,208

UNITED STATES PATENT OFFICE 2,527,208

SUPERSONIC TESTING APPARATUS

Theodore M. Berry and Richard Warren Samsel, Schenectady, N. Y., assignors to General Electric Company, a corporation of New York Application July 27, 1944, Serial No. 546,862

2 Claims. (Cl. 73—67)

Our invention relates to apparatus for testing conditions and materials by the use of mechanical vibratory waves, preferably vibratory waves above audio frequencies referred to as supersonic waves. As examples of the use of our invention, gas pressures may be determined thereby and the weight of fabrics may be determined thereby, and processes may be controlled in response to the supersonic wave absorption or transmission characteristic of a material or medium under investigation.

The method employed consists in transmitting mechanical vibratory waves through the material or medium being investigated one or more times and determining the extent to which the medium or material absorbs the energy of such waves, or the degree in which the waves are transmitted. We have discovered, for instance, that the energy absorption of supersonic waves by loose cotton fabric material in the process of being manufactured into thread is proportional to the weight of such material. The testing procedure may be carried out without bringing any test apparatus into contact with the material tested and while such material is stationary or moving, and the results can be made independent of variations in moisture content of the material.

Figure 2:
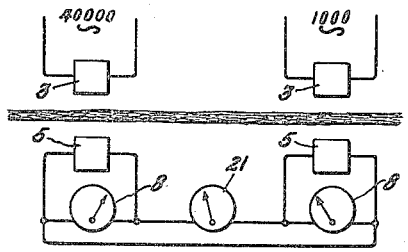
Figure 1:
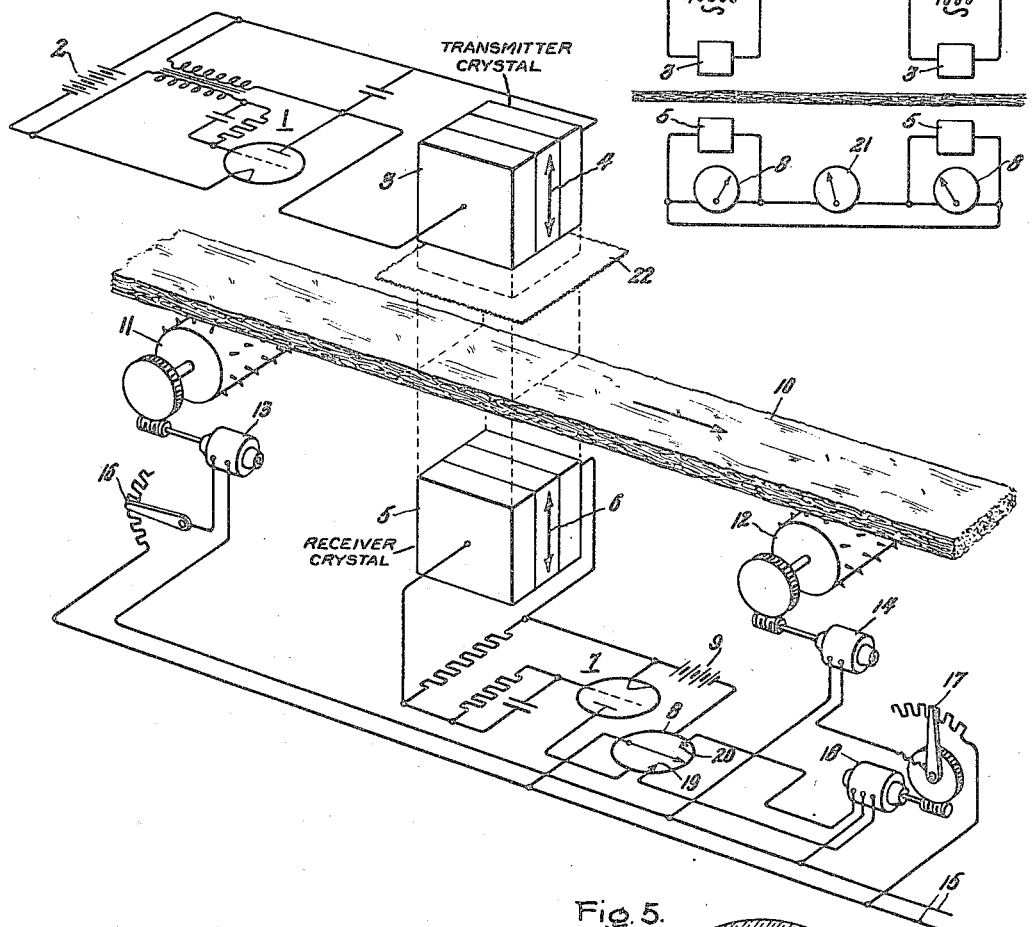
Figure 6:
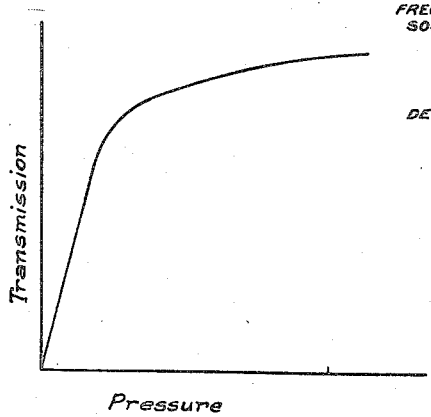
Figure 5:
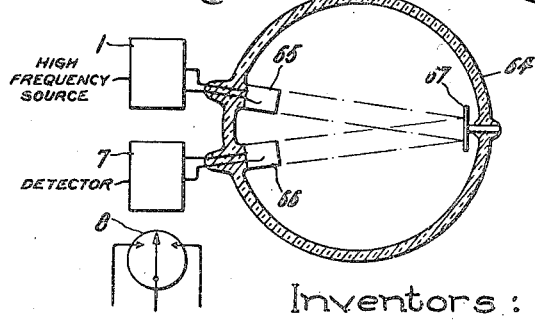
Figure 3:
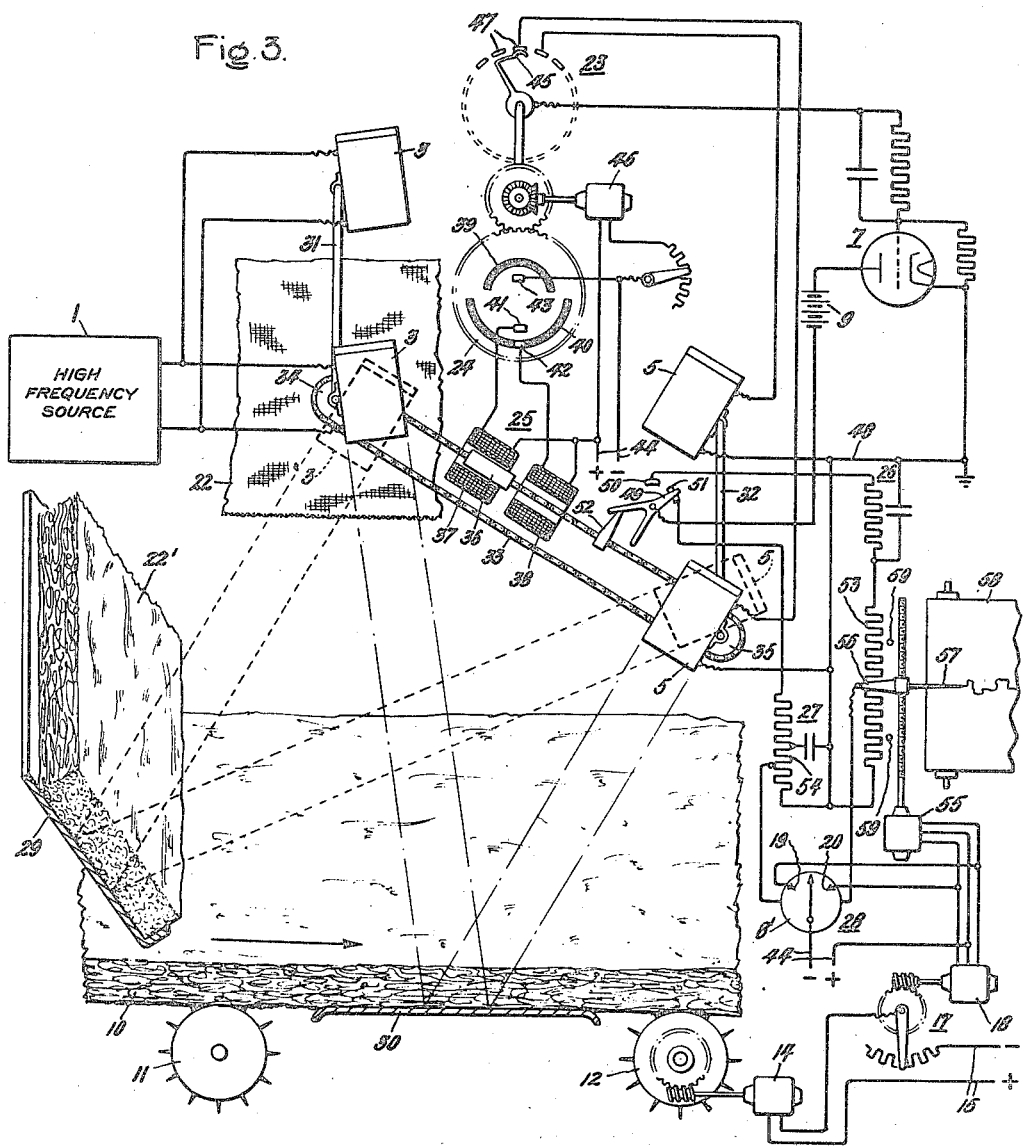
Figure 4:
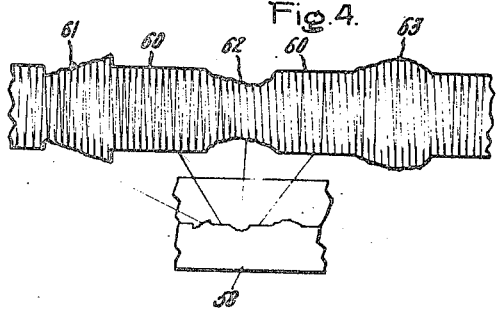

The features of our invention which are believed to be novel and patentable will be pointed out in the claims appended hereto. For a better understanding of our invention, reference is made in the following description to the accompanying drawings in which Fig. 1 represents in elementary form a complete fabric testing and control system embodying our invention. Fig. 2 is a diagrammatic representation of a system for measuring and segregating the moisture weight content of a material by the use of waves of materially different frequencies. Fig. 3 represents an embodiment of our invention where a material having a considerable area is scanned and the measurement results averaged and compared with a measurement similarly obtained on standard material of known weight. Fig. 4 represents a supersonic wave variation graph and corresponding record explanatory of the apparatus of Fig. 3. Fig. 5 represents apparatus that may be used as a vacuum gauge and for various other purposes, and Fig. 6 is a pressure-transmission curve of a vacuum gauge such as represented in Fig. 5.

Referring to Fig. 1, we have shown an oscillator 1 of the electronic feedback type supplied from a source 2 for generating supersonic electrical impulses of the orders of 40,000 cycles per second. These impulses are fed to a multiple crystal transducer 3 causing the crystals to vibrate back and forth in the direction indicated by double-headed arrow 4 to produce mechanical vibrations in the air in a corresponding direction and at a corresponding frequency. Positioned in the path of the directed beam of vibrations sent out by crystal 3 is a crystal type receiver 5, which is caused to vibrate in the direction indicated by double-headed arrow 6 by the received vibrations. The crystal 5 is connected in the input circuit of an electronic detector amplifier 7. The output circuit of the detector contains a direct current measuring instrument 8 and source of supply 9. This is a form of vacuum tube voltmeter. It will be evident that the amplitude of the impulses generated by crystal 5 will be dependent upon the energy of the vibratory impulses received, and that the indication of instrument 8 will vary in like manner.

Interposed between the transmitter and receiver crystals 3 and 5 is the material or condition to be tested. In this case we have represented a continuous strip 10 of matted cotton fibers called a lap, which is the general form of the raw cotton which is subsequently fed into carding machines in the thread manufacturing industry. To produce uniform thread, it is essential that the weight of such cotton laps be maintained within certain limits. We have discovered that such material interposed in the path of the vibratory impulses absorbs impulse energy in proportion to the weight of the material and reduces the impulse energy at the receiver crystal 5 in like proportion. Hence, when properly calibrated, the apparatus represented may be used to determine the weight of cotton laps and of various other fabric materials. Clothing goods, either before or after being processed into the form of cloth or before or after being made into garments, may be quickly sorted and classified as to weight without cutting or other harmful or wasteful operations; and where the invention is used in the initial stages of a process as here represented, the invention may be used to control the process to maintain uniformity.

As illustrated in Fig. 1, the cotton lap 10 is fed forward over suitable rollers 11 and 12 through the path of the supersonic vibrations. The rollers are represented as being driven by electric motors 13 and 14 supplied from a source 15, motor 13 having a manual speed adjusting device 16 and motor 14 a speed adjusting device 17 controlled automatically in response to the variations in the output of the crystal detector amplifier 6—7. As represented, the speed adjusting device 17 for motor 14 is controlled by a reversible motor 18 through reversing contacts 19 and 20 provided on the direct current measuring instrument 8. The position of the contacts 19 and 20 is preferably adjustable, and contact 20 when closed by the instrument pointer may cause the motor 18 to operate in such a direction as to reduce the speed of motor 14, and contact 19 when closed by the instrument pointer may cause the motor 18 to operate in such a direction as to increase the speed of motor 14. When both contacts 19 and 20 are open, motor 18 does not operate and motor 14 then runs at a fixed speed. The rollers 11 and 12 over which the lap 10 is fed past the testing station are provided with suitable projections to perform a gripping driving action on the lap, and are designed to provide more or less stretching or pulling-apart action on the lap. When the lap is within the desired weight limits, the rollers 11 and 12 run at approximately the same speed, and each substantially equally contributes to the movement of the lap with very little stretching action thereon. If the lap becomes too light, there will be less absorption of the impulse energy and higher output of the receiver 7, closing contact 20, causing motor 14 to decrease in speed slightly. Roller 12 will reduce its pulling action on the lap 10 with the result that there is less pulling apart of the cotton fibers, and hence, a greater weight per unit length results. If the lap becomes too heavy, there is greater energy absorption of the supersonic waves by it and less output from the receiver, causing contact 19 to be closed and motor 14 to increase in speed, increasing the stretching action on the lap between the rollers and bringing the weight per unit of length back to within the limits desired. Other lap forming and feeding apparatus not shown will be coordinated with the operation of the weight controlling rollers 11 and 12, so as to provide the desired correcting action explained. Whereas here the purpose of the control is to maintain the weight per unit of length uniform or within certain limits, the path of the supersonic waves should cover a representative portion of the width of the lap and a fixed area so that variations in weight at opposite edges of the lap, for example, will be averaged by the weight measuring apparatus.

We have found that if the frequency of the oscillations is above the audible range, say from 20,000 to 50,000 cycles per second, the weight measurements obtained with cotton are substantially independent of the moisture content of the material tested. Where, however, it becomes desirable to include the moisture content of such material in the weight, it can be done by reducing the frequency to within the audible or sonic range, for example, to 1000 cycles per second. Hence, as indicated in Fig. 2, with duplicate apparatus both the weight with and without the moisture content may be measured, and measuring apparatus represented at 21 may be used to obtain a differential measurement of the two receiver outputs in terms of moisture content.

In Fig. 1 we have represented at 22 a diffuser. In some cases it may be desirable to employ a diffuser. A diffuser may consist of a thin sheet of cotton flannel and serves to diffuse the supersonic beam before entering the material to be tested. It should be used in any case where the energy diminution due to diffusion as distinguished from absorption by the material to be tested from an undiffused beam is appreciable and erratic. If the diminution of beam energy by diffusion in the material to be tested is small and is proportional to the weight, a diffuser is unnecessary. It is not essential for cotton lap testing but may be used. Whether used or not, it is preferable to calibrate the apparatus as it is to be used.

It is immaterial to the testing procedure whether the material being tested is moving or stationary. In using the method with different kinds of material, it will be generally desirable to make some preliminary tests at different frequencies, with and without diffusers and with different spacings between the transmitter and receiver crystals to determine the optimum conditions, and after having determined such conditions, calibrate and make no changes without recalibrating. Calibration may be accomplished by substituting, in place of the material to be tested, standard samples of the same kind of material of known weights.

In Fig. 3 we have shown a differential scheme where the control of the system is accomplished by a measurement of the difference in weight of a standard material 22' and the material 10, the weight of which is subject to control. Also, we have shown the material being manufactured of considerable width such that it becomes desirable to measure its weight at several points by means of a plurality of transmitters 3 and receivers 5 and a scanning device at 23, which also operates a controller 24 which controls the shifting of the supersonic beam between the standard material 22' and the sample material 10 by means of a shifter mechanism at 25. The average weights of the standard and sample as obtained from the result of scanning over their widths are integrated after detection and rectification at 7 by integrators 26 and 27, and the outputs of these integrators are compared by a balancing type of control device at 28.

In Fig. 3 the supersonic beams between transmitters 3 and receivers 5 of the crystal type are reflected by reflector plates, one backing up the standard at 29 and the other partially supporting the sample at 30, so that the supersonic beams traverse the standard 22' and the sample 10 twice. These reflectors may be any hard smooth plate material such, for example, as glass steel, brass, or the like. The battery of transmitter crystals 3 is mounted on a rotatable shaft 31. Likewise the plurality of receiver crystals are mounted on a rotatable shaft 32. The shafts 31 and 32 are connected by suitable drive mechanism represented as a chain 33 and sprocket wheels 34 and 35. As represented, the transmitters 3 and receivers 5 are oriented so that the supersonic beams pass through the sample material 10 under test. By rotating the sprocket wheel and chain transmission clockwise by a limited amount, the transmitters and receivers will be shifted and oriented to pass the beams through the standard 22' as indicated by dotted lines. In either case the beams from the transmitters pass through the material, strike the proper reflector, and are reflected back through the material to the receivers which are properly oriented to receive the non-absorbed energy of the beams.

The shifter mechanism illustrated comprises a core 36 included as a part of the chain 33 and two cylindrical coils 37 and 38 spaced along the chain with the core part 36 movable within their axes. As represented, coil 37 is energized and has drawn the core 36 therein, positioning the parts to test position for the sample 10. When coil 37 is deenergized and coil 38 energized, core 36 will be drawn to within coil 38 and the apparatus shifted to measuring position with respect to the standard material 22'. The circuit controller 24 for the solenoids 37 and 38 is represented as a conducting disk having half-circle insulating sectors 39 and 40 at different radii with stationary brushes 41 and 42 radially positioned to contact with such sectors. The brushes 41 and 42 are connected to coils 37 and 38, respectively. Another stationary brush 43 connects to one side of a source of supply 44, while the coils 36 and 37 are connected to the other side of such source. The control disk 24 is driven with the rotary scanning contactor 45, and the arrangement is such that disk 24 makes one revolution while the scanning contactor 45 makes two revolutions. This scanner arrangement is driven continuously by a variable speed motor represented at 46, and the rate of scanning and shifting may be controlled by varying the speed of this motor 46. The stationary contacts 47 of the scanner are equal in number to the several receiving crystals 5 and are individually connected to one output lead of the receiving crystals so that as the scanner contact 45 makes a complete revolution, the several receiver crystals are consecutively connected thereto in rotation and then the operation is repeated. While only two crystal receivers are shown, a larger number is contemplated. After each complete revolution of the scanning brush 45, the supersonic beam system is shifted between standard 22' and sample 10 as previously explained. The scanning brush 45 is connected to the grid leak input circuit of the rectifying amplifying detector 7, and the other output leads from the several crystal detectors are connected through a common wire 48 to the cathode of the detector rectifier 7.

The output of rectifying detector 7 is adapted to be connected to an integrating condenser at 26 through a switch blade 49 and contact 50 when the standard material at 22' is being scanned by the apparatus, and the output of the detector 7 is shifted to an integrating condenser at 27 through switch blade 49 and contact 51 when the sample material 10 is being scanned. The switch blade 49 is moved from one position to the other by a finger 52 on the chain 33 and so this shift occurs simultaneously with the shift of the beam control from the standard 22' to the sample 10, and vice versa.

It will now be evident that there will be built up on the condenser at 26 a voltage inversely proportional to the average energy absorbed by the standard material 22', and the voltage across the condenser at 27 will be inversely proportional to the average energy absorbed by the sample 10, and that the conditions are favorable to an accurate comparison. The transmitter and receiver apparatus used is the same in both instances and the time interval during which condensers 26 and 27 are being charged and discharged is the same, so that the differential comparing scheme is independent of expected variations in power supply, frequency, and characteristics of the supersonic system and of the detector receiving apparatus 7 and its power supply 9. Moreover, the system is responsive to the average weight of the standard and sample materials over their entire widths. The average voltages of the integrators 26 and 27 are compared by a balancing control bridge. Thus a resistance 53 is connected across integrator 26 and a resistance 54 is connected across integrator 27. Across intermediate points of these resistances there is a connection including the control instrument 8'. The instrument connection 56 to resistance 53 is adjustable by a reversible motor 55 controlled by contact making instrument 8', so as to maintain the bridge substantially balanced and the current through the instrument substantially zero by proper adjustment of the position of the potentiometer tap 56. At the same time the instrument 8' controls the process of manufacture of material 10 as to its weight through apparatus similar to that described in connection with Fig. 1 and represented as the adjustable speed fabric stretching motor 14. The movable contact device 56 may also include a recording pen 57 recording on a chart 58 to record the variations in weight of the material 10 as compared to that of the standard material 22'. The recorder device may be provided with limit switches indicated at 59 to stop the process in case the weight of the sample departs too much from the standard.

In Fig. 4 at the top we have represented a graph indicating in general the nature of the received intensity variation of the supersonic wave and at 58 the corresponding records that might be obtained. About three double scanning cycles have been represented. The vertical dimension of the upper graph represents the intensity of the received waves. Where this dimension is uniform, as at 60, are represented those portions of the scanning cycle when the standard material is being scanned. At 61 of the graph the sample 10 is being scanned and one side is light and the other side heavy but the average weight is satisfactory.

At 62 the graph indicates heavy weight of sample 10 and high energy absorption with less received energy, and at 63 there are indicated light weight of sample 10, low energy absorption, and greater received energy. The nature of the corresponding records that might be obtained on the chart 58 with rather high speed chart movement is indicated by the lines connecting different portions of the graph with corresponding portions of the record.

In Fig. 5 we have shown a vacuum gauge embodying our invention where 64 represents a cross section of a sealed chamber in which it is desired to measure or maintain a high but not absolute vacuum of a gaseous medium such as air. Within the chamber there are supported a supersonic wave transmitting crystal 65 and a receiving crystal 66 positioned relative to each other and with respect to a reflector 67, such that there will be good reception by crystal 66 of vibrations sent out by crystal 65 in a transmitting medium such as air. The reflector is preferably mounted on the opposite side of the chamber from the crystals as represented. One (1) represents a source of high frequency and 7 a detector receiver such as are represented by like reference characters in Fig. 1. Eight (8) represents a vacuum tube voltmeter with control contacts. The crystals are connected to devices 1 and 7 through leads sealed through the wall of chamber 64. It is evident that with a perfect vacuum there will be no transmission of vibratory waves between the transmitter and receiver because a perfect vacuum does not transmit mechanical vibratory waves. However, with any gaseous medium in the chamber transmission will occur, and over a range from zero up to a fraction of a pound pressure the extent of wave transmission will increase rapidly, in general, as represented by the pressure-transmission curve of Fig. 6. Over the range represented by the steep portion of the curve this device makes a very sensitive vacuum gauge, the operation being based on transmission rather than on absorption.

Assume now that the same chamber represented in Fig. 5 be a pulp mixing tank in the paper making industry, where wood pulp in a fibrous condition is mixed with water. Water is a much better conductor of mechanical vibratory waves than the wood pulp, and hence, the energy absorption will increase with the increase in pulp concentration. Hence, the invention is applicable here to measure the water content of pulp in the paper making industry and to control the process by suitable control apparatus. These and other applications of the invention will occur to those skilled in the art and are intended to be included in the broader aspect of our claimed invention.

What we claim as new and desire to secure by Letters Patent of the United States is:

1. Apparatus for testing the weight of materials comprising apparatus for supporting a material to be tested in test position, means for transmitting waves through such material of a frequency such that the waves are absorbed by the material in proportion to its weight, an oscillator for energizing said transmitter at the proper frequency, means for diffusing the transmitted waves before entering the material so that the diminution of the waves by the material is primarily due to absorption and not diffusion, a receiver positioned to intercept waves after having passed through the material, and means for measuring the output of said receiver in terms of the weight of the material tested.

2. Apparatus for testing materials comprising a plurality of supersonic mechanical vibratory wave transmitters, a supersonic wave receiver for each of said transmitters, said transmitters and receivers being so relatively positioned in pairs that waves transmitted by the several transmitters may be individually received by the several receivers and such that the waves between different pairs of transmitters and receivers take different paths, means for interposing a material to be tested in all of said different paths simultaneously, an amplifier detector, and a cyclic scanning device for progressively connecting said detector to the several receivers, and means for intergrating the output of said detector over the scanning cycle.

THEODORE M. BERRY.
RICHARD WARREN SAMSEL.

REFERENCES CITED

The following references are of record in the file of this patent:

UNITED STATES PATENTS

| Number | Name | Date |
|---|---|---|
| Re. 22,293 | Keinath | Mar. 23, 1943 |
| 1,135,000 | Donaldson | Apr. 13, 1915 |
| 1,414,077 | Fessenden | Apr. 24, 1922 |
| 1,789,369 | Meissner | Jan. 20, 1931 |
| 1,898,066 | Schweitzer et al. | Feb. 21, 1933 |
| 1,973,673 | Rice | Sept. 11, 1934 |
| 2,105,479 | Hayes | Jan. 18, 1938 |
| 2,164,125 | Sokoloff | June 27, 1939 |
| 2,178,252 | Forster | Oct. 31, 1939 |
| 2,280,226 | Firestone | Apr. 21, 1942 |
| 2,305,783 | Heymann et al. | Dec. 22, 1942 |
| 2,361,217 | Lewis | Oct. 24, 1944 |
| 2,378,237 | Morris | June 12, 1945 |

FOREIGN PATENTS

| Number | Country | Date |
|---|---|---|
| 278,316 | Germany | Sept. 25, 1914 |

OTHER REFERENCES

French publication, "Methods Ultra-Sonores dans L'Essai des Materiaux" (E. Baumgardt-Ann. des Travaux Publics: Janv.-fev. 1939) reviewed in Mesures, Oct. 1939, pages 21, 23, 25 and 27. (Photostatic copy in Div. 36, U. S. Patent Office.)

"Supersonics, The Science of Inaudible Sounds," by R. W. Wood (published by Brown University, Providence, R. I., in 1939), pages 121 through 123 and 137 through 140. (A copy is available in Div. 34.)